United States Patent
Matty

(10) Patent No.: US 6,191,361 B1
(45) Date of Patent: *Feb. 20, 2001

(54) TERMINAL ELECTRICAL RECEPTACLE OUTLET BOX

(76) Inventor: George T. Matty, 602 National Pike W., Brownsville, PA (US) 15417

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/055,569

(22) Filed: Apr. 6, 1998

Related U.S. Application Data

(60) Provisional application No. 60/042,781, filed on Apr. 7, 1997.

(51) Int. Cl.[7] .................................................. H01H 13/04
(52) U.S. Cl. .............................................. 174/53; 174/59
(58) Field of Search ................................. 174/50, 58, 53, 174/59, 60; 220/3.2, 3.3, 3.5, 3.6

(56) References Cited

U.S. PATENT DOCUMENTS

| | | | |
|---|---|---|---|
| 3,327,176 | * 6/1967 | Rexroad | 174/59 X |
| 3,417,192 | * 12/1968 | Elm | 174/59 |
| 3,523,156 | * 8/1970 | Phillips, Jr. | 174/60 X |
| 3,720,778 | * 3/1973 | Woertz et al. | 174/59 |
| 3,728,470 | * 4/1973 | Maier | 174/58 |
| 4,172,962 | 10/1979 | Legerius et al. | 174/53 |
| 4,209,154 | * 6/1980 | Hehl | 220/3.6 X |
| 4,232,915 | * 11/1980 | Hahn | 174/53 X |
| 4,295,018 | * 10/1981 | Borrelli | 174/53 X |
| 4,382,155 | * 5/1983 | Borin et al. | 174/60 X |
| 4,414,426 | * 11/1983 | Burtelson | 174/59 |
| 4,627,684 | 12/1986 | D'Amato | 339/206 |
| 5,052,950 | * 10/1991 | Wilson | 174/59 X |
| 5,243,134 | 9/1993 | Nattel | 174/53 |
| 5,380,951 | 1/1995 | Comerci et al. | 174/48 |
| 5,413,501 | 5/1995 | Munn | 439/622 |
| 5,717,164 | * 2/1998 | Shetterly | 174/58 |
| 5,721,394 | * 2/1998 | Mulks | 174/58 X |

* cited by examiner

Primary Examiner—Dean A. Reichard

(57) ABSTRACT

An electrical receptacle outlet box is provided having a box opening at its outer face for receiving a conventional electrical receptacle. Adjacent to and at either side of the box opening are front mounting panels upon which wiring terminals are mounted. Each front mounting panel is angled away from the box opening, making the wiring terminals easily accessed, and allowing for conventional wiring to be pre-terminated within the outlet box.

3 Claims, 1 Drawing Sheet

TERMINAL ELECTRICAL RECEPTACLE OUTLET BOX

CROSS REFERENCE

This application is based upon, and claims priority of U.S. Provisional Application Ser. No. 60/042,781, filed Apr. 7, 1997, for TERMINAL ELECTRICAL RECEPTACLE OUTLET BOX.

BACKGROUND OF THE INVENTION

1. Field of the Invention

The present invention relates generally to electrical receptacle outlet boxes and, more particularly, to an electrical receptacle outlet box including terminal connectors for allowing convenient pre-wiring of a receptacle box before installation of the electrical outlet.

2. Description of the Related Art

In the related art, many methods of securing an electrical receptacle within an outlet box in electronic communication with wiring systems are known. For example, in U.S. Pat. No. 5,413,501 issued in the name of Munn, an electrical outlet box is disclosed having a clamp connector for securing incoming wiring, as well as including a specialized electrical receptacle for allowing quick and easy wiring of the receptacle. Such a device, however, does not appear to be capable of being used with conventional duplex receptacles.

Also, in U.S. Pat. No. 5,380,951, issued in the name of Comerci et al., an outlet assembly is disclosed utilizing specialized, flat ribbon cable.

Other disclosures are known which provide either ease of mounting, or ease of wiring for specialty applications. These include:

- U.S. Pat. No. 5,243,134, issued in the name of Nattel, wherein a combination power and communication electrical wall terminal is disclosed;
- U.S. Pat. No. 5,229,922, issued in the names of Muramatsu et al., wherein an electrical junction box with stacked insulating plates and bus-bars with stepped tabs is disclosed;
- U.S. Pat. No. 5,415,564, issued in the name of Winter et al., wherein a junction box for quick release mounting of electrical circuit components is disclosed;
- U.S. Pat. No. 4,627,684, issued in the name of D'Amato, wherein a housing for electrical connectors is disclosed; and
- U.S. Pat. No. 4,172,962, issued in the name of Legerius et al., wherein a terminal box is disclosed intended to be used in combination with a socket outlet or the like.

Although effective in accomplishing their particular intent, none of these references allow a user to easily pre-wire conventional residential, commercial, or industrial wiring systems, especially prior to enclosing such wiring systems behind drywall or other interior wall finish, such that the remaining wiring of standard electrical receptacles can be easily completed. Consequently, a need has been felt for providing an apparatus and method which can be used to pre-wire an outlet box such that the outlet receptacles can be efficiently wired at a later time.

SUMMARY OF THE INVENTION

It is therefore an object of the present invention to provide an improved electrical receptacle outlet box which can be pre-wired to a conventional electrical system, such that individual receptacle outlets can be quickly and easily attached or reattached within the outlet box at a later time.

Briefly described according to one preferred embodiment of the present invention, an electrical receptacle outlet box is provided having a box opening at its outer face for receiving a conventional electrical receptacle. Adjacent to either side of the box opening are front mounting panels upon which wiring terminals are mounted. By angling each front mounting panel away from the box opening, these wiring terminals are easily accessed, and allow for conventional wiring to be pre-terminated within the outlet box.

Generally, an advantage of the present invention is that electrical rough wiring in commercial or residential facilities can be pre-wired within each outlet box. Electrical finished wiring can then be accomplished at a later time.

Other benefits of these advantages are known and envisioned; however, it is felt that generally the present invention can ease installation of finished electrical wiring, as well as ease scheduling restrictions caused by conflicts among construction subcontractors.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
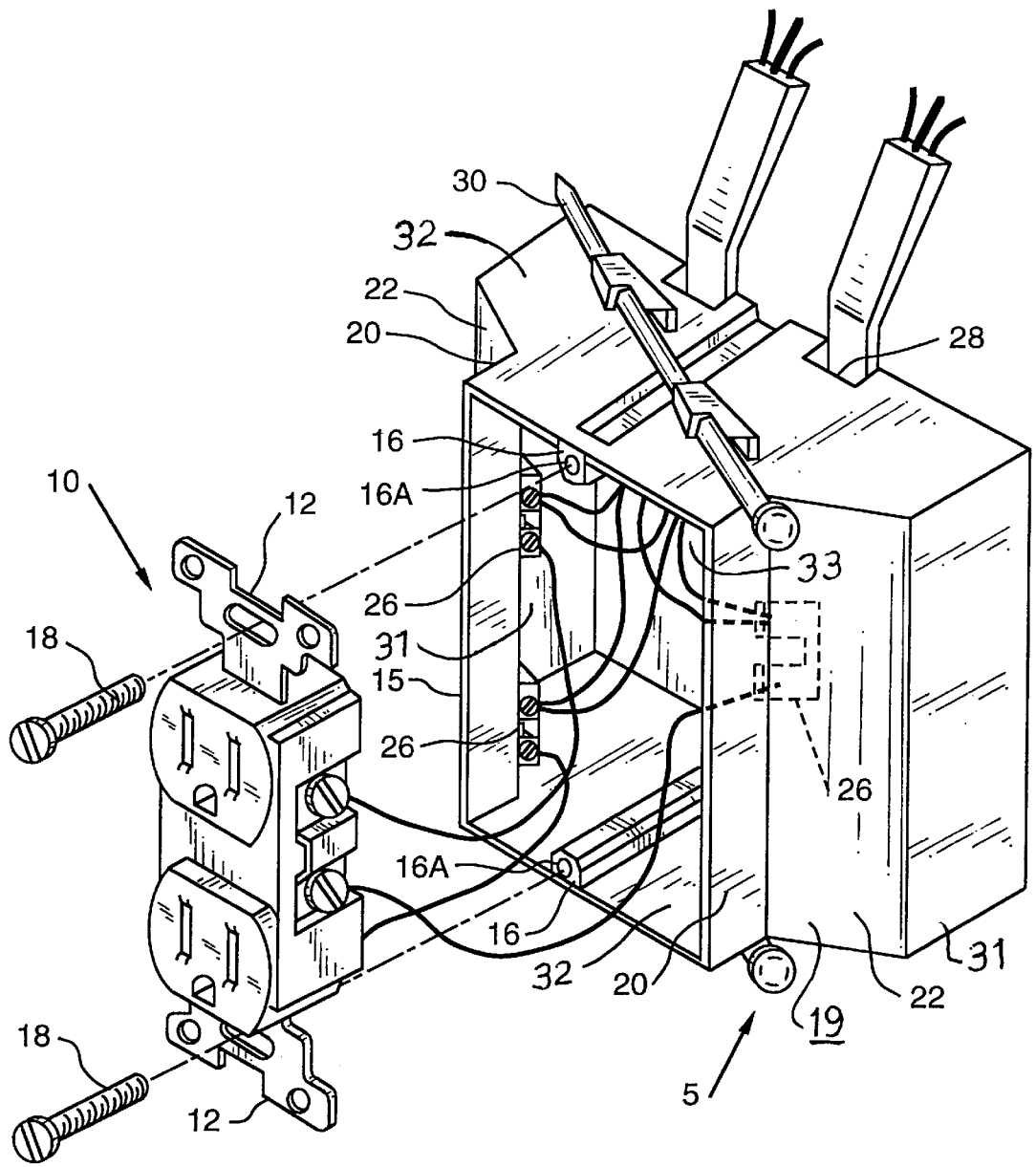
FIG. 1 is an exploded perspective view of an electrical receptacle outlet box accordingly to the preferred embodiment of the present invention, showing the connection of an electrical outlet to an outlet box utilizing said present invention.

Referring now to FIG. 1, an electrical receptacle outlet box 5 is shown, according to the present invention, for use with an electrical receptacle 10 as shown in FIG. 1 and described below. The electrical receptacle 10 is provided with an external support flange 12, or a pair of opposing support flanges 12. The outlet box having an 5 forms a box opening 15 in its front face 14. A support tab 16 affixes perpendicularly to the box opening 15 and extends slightly within the opening, and forms and contains a threaded screw receiving hole 16A such that the threaded screw receiving hole 16A becomes available and accessible for attachment of a standard electrical receptacle 10 or switch (not shown) by way of conventional screw type fasteners 18.

Although it will become apparent to one skilled in the art that the present invention may be utilized in a variety of differing sizes, shapes, and materials (plastic, 20 gauge spring steel, etc.), for purposes of disclosure of the preferred embodiment it is felt that the opening 15 is of the same perimeter dimensions as a standard, conventionally available outlet box. Therefore, conventional wiring, receptacles, switches, etc. can be used in conjunction with the present invention without modification or additional cost. The opening 15 is extended outward from face 19 by a recess amount, shown as 20, designed to be the same dimension as the standard thickness of currently available drywall materials. A pair of front mounting panels 22 of front face 19 skirt the opposing sides of the opening 15, and provide a mounting surface for a plurality of wiring terminals 26 having an insulated terminal block with multiple screw-down clamp connectors. By angling each front mounting panel 22 away from the box opening 15 inward toward the interior of the box 5 as shown, these wiring terminals 26 are easily accessed from opening 15, and allow for conventional wiring to be pre-terminated within the outlet box 5. Box 5 is further defined by sides 31, top and bottom panels 32 and back panel 33.

Further, it is currently envisioned that the present improved outlet box 5 would include many individual features associated with presently available outlet boxes. For example, inclusion of cabling orifices 28 into the rear of the box 5 allow for easy access of sheathed wiring of the type currently utilized with conventional residential or commercial construction. Further, a stud affixment means 30, shown herein as a nail, can be included to allow for easy attachment of the outlet box 5 to a wall's framing members. These features, although individually presently available, have not been known to be included on an improved outlet box of the type presently disclosed. The inclusion of such features allow for the integration of the present invention into existing construction techniques.

2. Operation of the Preferred Embodiment

In accordance with a preferred embodiment of the present invention, electrical outlet box 5 of the present invention is used as would, and in replacement of, presently available conventional outlet boxes. By the inclusion of easily accessed wiring terminals, the facilities wiring can be rough wired to, and terminated within, the present outlet box 5. Construction can continue in a neat and orderly fashion, without the need to worry about leaving enough available wiring to reach individual receptacles, and without worrying about the schedule constraints of electricians, drywallers, carpenters, etc. The receptacle 10 can be added utilizing individual conductors communicating with the appropriate wiring terminals 26 at any time.

The foregoing description is included to illustrate the operation of the preferred embodiment and is not meant to limit the scope of the invention. The scope of the invention is to be limited only by the following claims.

What is claimed is:

1. An electrical outlet box including a front face, side panels, top and bottom panels and a back panel and forming an internal volume having an accessible opening in the front face, said outlet box comprising;

said front face including at least one front mounting panel having an outer face and an inner face and positioned adjacent to said outlet box opening; and at least one wiring terminal affixed to the inner face of said at least one mounting panel within the internal volume of said box for access thereto through said opening, said at least one wiring terminal capable of affixing to and communicating with wiring systems and electrical receptacles and switches.

2. The electrical outlet box as described in claim 1, wherein the inner face of said at least one front mounting panel is angled away from said opening toward said back panel such as to make said at least one wiring terminal accessible from outside of said box through said opening.

3. The electrical outlet box as described in claim 2, wherein said at least one wiring terminal is an insulated terminal block having multiple screw-down clamp connectors.

* * * * *